United States Patent [19]

Walker et al.

[11] Patent Number: 4,508,628

[45] Date of Patent: Apr. 2, 1985

[54] FAST DRILLING INVERT EMULSION DRILLING FLUIDS

[75] Inventors: Thad O. Walker, Humble; Jay P. Simpson, Houston; Harry L. Dearing, Sugarland, all of Tex.

[73] Assignee: O'Brien-Goins-Simpson & Associates, Houston, Tex.

[21] Appl. No.: 441,418

[22] Filed: May 19, 1983

[51] Int. Cl.$^3$ ............................................. C09K 7/06
[52] U.S. Cl. ................................. 252/8.5 P; 252/8.5 M
[58] Field of Search ........... 252/8.5 P, 8.5 M, 8.55 R, 252/39

[56] References Cited

U.S. PATENT DOCUMENTS

| | | | |
|---|---|---|---|
| 2,782,163 | 2/1957 | Wilson et al. | 252/8.5 P |
| 2,995,514 | 8/1961 | Jordan et al. | 252/8.5 M |
| 3,099,624 | 7/1963 | Wilson | 252/8.5 M |
| 3,634,235 | 1/1972 | Wilson et al. | 252/8.5 P |
| 3,954,627 | 5/1976 | Dreher et al. | 252/8.5 P |
| 3,956,142 | 5/1976 | Wilson et al. | 252/8.5 P |
| 4,105,578 | 8/1978 | Finlayson et al. | 252/8.5 P |
| 4,306,980 | 12/1981 | Brandt et al. | 252/8.5 M |
| 4,374,737 | 2/1983 | Larson et al. | 252/8.5 P |
| 4,381,241 | 4/1983 | Romenesko et al. | 252/8.5 P |
| 4,402,881 | 9/1983 | Alther | 252/8.5 M |
| 4,436,862 | 3/1984 | Tetenbaum et al. | 524/445 |

FOREIGN PATENT DOCUMENTS

| | | | |
|---|---|---|---|
| 0580454 | 9/1946 | Canada | 252/8.5 M |
| 0578341 | 6/1959 | Canada | 252/8.5 P |

*Primary Examiner*—Ben R. Padgett
*Assistant Examiner*—Howard J. Locker
*Attorney, Agent, or Firm*—Roy F. House

[57] ABSTRACT

Disclosed are invert oil emulsion drilling fluids containing a non-toxic, biodegradable oil having a viscosity at 25° C. of less than 1.5 centipoise, a flash point of at least 60° C., an aniline point of at least 80° C., and a content of aromatic hydrocarbons of less than 1% by volume. These drilling fluids have a low viscosity at the high shear rates imparted to a drilling fluid at the bit during drilling. This low bit viscosity provides for faster penetration rates. Such drilling fluids containing a temperature stabilizing additive exhibit superior thermal stability.

8 Claims, No Drawings

FAST DRILLING INVERT EMULSION DRILLING FLUIDS

The present invention relates to oil base drilling fluids (oil-muds). More particularly it relates to invert water-in-oil emulsion drilling fluids in which the oil phase is selected to provide the drilling fluid with enhanced performance characteristics.

An oil-mud consists of a continuous oil phase with water emulsified in the oil. Additives are used to stabilize the emulsion, oil wet the barite and other mud solids, and impart suspension and fluid loss control to the mud.

All oil-muds are designed to function with a range of water contents. This is a necessary feature, since water can enter the mud as a contaminate at any time. Normally, the mud will be maintained at lower water contents in the higher mud weight range.

The oil phase of a mud is usually No. 2 diesel oil, but other oils can be used in special situations, such as a non-polluting mineral oil in environmentally-safe drilling fluids.

The water phase may range from freshwater to near saturated calcium chloride water. However, it is never desirable to allow the water to become saturated or super-saturated with calcium chloride. In this condition, a hydrate of the salt will come out of solution as the mud cools and carry water that will weaken the emulsion and cause water wetting of the mud solids. From 35 to 38 percent calcium chloride in the water in an upper limit for safe operation.

Most oil-muds use a calcium or magnesium fatty-acid soap as the primary emulsifier. The soap is an adequate emulsifier at temperatures up to about 275° to 300° F. for freshwater or sodium chloride water. At higher temperatures and for calcium chloride water, special supplemental emulsifiers, generally polyamides, are needed. The soap also adds viscosity to the oil and provides a weak gel structure which helps in barite suspension.

The emulsified water also adds viscosity and fluid loss control to the mud. The emulsified water droplets affect viscosity in the same manner as inert solids. As mud density is increased, it is necessary to decrease the maximum allowable water content in order to minimize the plastic viscosity. At mud weights above 18 lb/gal. the water content should be less than 12 percent. The water also decreases fluid loss in the same manner as oil emulsified in a water-base mud.

All of the solids in an oil-mud must be wet by the oil. Otherwise, they will agglomerate and cause high viscosities and settling. Since barite and drilled solids are naturally water-wet, an oil-wetting agent is necessary in oil-mud. The soaps do some of the oil wetting. However, they are not strong enough nor do they act fast enough to handle a large influx of water-wet solids. Rapid additions of barite, fast drilling in soft shales, and water-mud contamination are all cases where a special oil-wetting surfactant is needed.

Although the soap and water contents provide viscosity to an oil-mud, additional viscosity is often needed for suspension, especially in the lower mud weight range. Either asphalts or amine treated bentonite are normally used for this purpose. Asphalt either softens or goes into solution in the oil to cause thickening of the oil. It may also react with other mud components to cause development of a greaselike structure. The amine treated bentonite is dispersible in oil and acts as a colloid to cause increased viscosity.

Due to the combined effects of emulsified water, soap, oil-wet solids, and other colloidal materials, oil-muds have inherently low fluid loss. There are occasions, however, such as ultra-high temperature, where additional fluid loss control is desired. A number of different fluid loss control agents are available to provide this need. Asphalt, polymers, and amine treated lignite are all used as fluid loss control agents.

The properties of oil-muds differ from those of water-base muds in several respects. First the temperature-pressure effects on oil are considerably different than on water.

Increasing temperature causes the viscosity of both oil and water to decrease at about the same rate. However, increasing pressure causes significant increases in the viscosity of oil, but does not appreciably affect the viscosity of water. Oil-muds will not respond to temperature and pressure exactly the same as oil because of the materials dissolved in the oil. Muds with a high asphalt content or a grease-type structure will thin more rapidly than oil with increased temperature.

At ambient conditions, diesel oil has about three-fold higher viscosity than freshwater. This means the plastic viscosity will tend to be higher in an oil-mud than in a water-mud. This fact coupled with the fact that the viscosity of oil increases with pressure, means that the viscosity at the bit will tend to be considerably higher in an oil-mud than in a water-mud. This leads to several functional differences downhole between the two mud types.

The thickening of oil with pressure will cause the fluid loss to be lower downhole than measured in the HTHP test. This probably has little significance since the measured fluid loss of an oil-mud is usually lower than a water-mud. It could partially explain the better performance of an oil-mud at preventing differential pressure sticking.

The higher plastic viscosity of an oil-mud means higher frictional pressure losses in the drillstring and potentially lower penetration rates than with a comparable weight water-mud. These are both significant drawbacks of an oil-mud.

The increase in viscosity of oil with increased pressure causes all of the flow properties to increase. This leads to increased pressure losses in the annulus. There are some reasons to believe that oil muds are more inclined to cause lost returns than a water-mud.

The electrical interaction of solids which develop yield point and gel strength in water-muds are not active in oil-muds, hence, the yield point and gel strengths of an oil-mud tend to be less than in a water-mud. Flocculation and gelation at high temperatures is also much less pronounced in oil-muds.

The difficulty in building gel strength and yield point in an oil-mud has a negative aspect. Barite suspension sometimes presents a problem. This is especially true when the mud is used as a packer fluid. Even amine treated bentonite does not prevent barite settling at high temperatures, although the mud may appear very viscous. Oil-wetting and dispersing the barite appears to be absolutely essential in preventing settling. Settling will often occur in a newly prepared mud until the barite has become oil-wet and dispersed. Gel strengths of 3 to 6 appear to be adequate for a drilling fluid.

Although water base muds have been used predominately for drilling oil and gas wells, there are some geological areas where the use of such muds is very costly because of severe bore hole problems that are sometimes encountered. These well bore problems are usually related to shale hydration and other forms of formation instability. Many shale formations are easily destabilized when contacted with various waters, particularly fresh water. Consequently, washouts, sloughing of formations and many other problems related to destabilization occur when water base muds are used. Some formations such as massive salt sections are easily washed out by water base muds and this too can cause severe hole problems. In other cases, differential pressure sticking is a problem very commonly associated with the use of water base muds in low pressure, depleted sands.

Over the years oil-muds have come into widespread use in order to provide better well bore stabilization and to minimize drilling problems. One of the drawbacks of the oil base mud systems has been the slower drilling rates as compared to water base mud systems. Recent technical advances using relaxed fluid loss techniques in oil-mud systems have resulted in drilling rates comparable to water base muds. These oil base systems are referred to as low colloid oil-muds.

Published laboratory studies show that the low-colloid oil-muds can be formulated to provide faster drilling rates while maintaining the performance advantages of conventional oil-muds. The characteristics that generally make these low-colloid oil-mud systems unique are as follows:

1. low viscosity oil phase;
2. low concentration of emulsified water;
3. high salinity, using calcium chloride or sodium chloride, to saturation;
4. oil wetting surfactant in order to provide emulsification for the water (no colloidal soaps or asphaltenes);
5. oil dispersible organo-clays that help suspend and provide hole cleaning without high viscosity and high shear rates;
6. no colloidal material for filtration control unless it is required to combat excessive seepage or filtration to the formation.

These faster drilling oil-muds are designed to limit the concentration of colloidal solids. A low-colloid oil-mud having a high spurt loss will allow the liquid phase to penetrate into the cracks that are formed by the drill bit and actually help remove the formation chip. A lower viscosity can be maintained in the oil-mud if the colloid content is minimal. The low viscosity can also reduce the pressure loss in the drill stem and allow for more hydraulic horsepower to be utilized at the bit. This also helps in chip removal.

Despite the recent advances in faster penetration rates provided by the low-colloid oil-muds, there is a need to provide environmentally acceptable, fast drilling oil-muds particularly for use in offshore drilling areas.

It is thus an object of this invention to provide invert oil emulsion drilling fluids containing a non-toxic, low viscosity, biodegradable oil having a high flash point and aniline point, and containing primarily straight chain paraffinic hydrocarbons and less than 1% by volume of aromatic hydrocarbons, as the continuous phase.

It is another object of this invention to provide invert oil emulsion drilling fluids having enhanced temperature stability and penetration rate characteristics.

These and other objects of this invention will be readily apparent from the description and claims which follow.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

We have now found that a fast drilling oil-mud can be formulated using as the continuous phase an environmentally acceptable, biodegradable, refined petroleum oil having the following characteristics:

(a) a viscosity less than 1.5 centipoises (cp.) at 25° C.;
(b) a flash point of at least 60° C.;
(c) an aniline point of at least 80° C.; and
(d) a content of aromatic hydrocarbons of less than 1% by volume, as determined by ASTM Standard Procedure D2140.

Such oil-muds containing a temperature stabilizing additive as hereinafter defined exhibit superior thermal stability as compared to oil-muds prepared with oils disclosed in the prior art.

The oil-mud contains the refined petroleum oil, water, and a water-in-oil emulsifier. Higher density oil-muds are obtained by adding a particulate weighting agent and a suspending agent. Stabilizing agents to ensure the oil wetting of any solids which enter the oil-mud may be added. A fluid loss control agent to reduce the loss of the petroleum oil to the formations contacted by the oil-mud may be necessary when drilling in highly permeable formations. The preferred oil-muds contain a temperature stabilizing additive as described hereinafter.

The various components and characteristics of our oil-mud will now be considered in more detail.

Oil Phase

The oil used to formulate the oil-muds of this invention is a refined petroleum oil fraction containing primarily straight chain paraffinic hydrocarbons and less than one volume percent of aromatic hydrocarbons. The viscosity of the oil must be less than 1.5 centipoises at 25° C., and the oil must have a minimum flash point and aniline point of 60° C. and 80° C., respectively. Such an oil is biodegradable, safe to use, and allows the production of oil-muds having a low viscosity at the high shear rates imparted to a drilling fluid at the bit during drilling. This low "bit viscosity" provides for faster penetration rates.

Water Phase

The oil-mud should contain from about 5% to about 35% of a dispersed aqueous phase, preferably from about 8% to about 25%, these percentages being % by volume of the liquid phase. Preferably the aqueous phase will contain sodium chloride or calcium chloride, most preferably calcium chloride, in an amount up to saturation of the aqueous phase. The low viscosity petroleum oil used in these oil-muds allows the incorporation of more emulsified water into the mud without adversely effecting the rate of penetration when utilizing the mud in a drilling process.

Emulsifier

The emulsifier used in preparing the invert oil emulsion drilling fluids of this invention may be any of the commonly used water-in-oil emulsifiers used in the oil and gas drilling industry. These include the various fatty acid soaps, preferably the calcium soaps, polyamides, and combinations of these emulsifiers. The soaps may be formed in-situ in the oil-mud by the addition of the desired fatty acid and a base, preferably lime. Representative emulsifiers are listed in the following U.S. Pat. Nos., incorporated herein by reference: 2,861,042; 2,876,197; 2,994,660; 2,999,063; 2,962,881; 2,816,073; 2,793,996; 2,588,808; 3,244,638.

The preferred fatty acid containing materials contain a fatty acid having eighteen carbon atoms, such as stearic acid, oleic acid, linoleic acid, preferably tall oil, air blown tall oil, oxidized tall oil, tryglycerides, and the like.

The preferred polyamide emulsifiers result from the reaction of a polyalkylene polyamine, preferably a polyethylene polyamine, with from about 0.4 to about 0.7 equivalents of a mixture of fatty acids containing at least 50% by weight of a fatty acid having 18 carbon atoms, and with from about 0.3 to 0.6 equivalents of a dicarboxylic acid having from 4 to 8 carbon atoms. The reaction can be represented by the following equation:

$$H_2N[C_aH_{2a}NH]_bH + d\ R-COOH + e\ R'-(COOH)_2 \rightarrow Polyamide$$

where $2 \leq a \leq 3$, $2 \leq b \leq 6$, $0.4(b+1) \leq d \leq 0.8\ (b+1)$, $d + 2e = b + 1$, R—COOH is said mixture of fatty acids containing at least 50% by weight of a fatty acid having 18 carbon atoms, and R' is a difunctional organic radical containing from 2 to 6 carbon atoms. Most preferably $a = 2$, $3 \leq b \leq 5$, $0.45(b+1) \leq d \leq 0.7(b+1)$, R' contains two carbon atoms, and R—COOH is derived from tall oil.

The polyamides are prepared by first reacting the polyamine with the fatty acid to form an amidoamine, preferably at a temperature from about 200° C.–210° C. for one hour, and thereafter reacting the amidoamine intermediate with the dicarboxylic acid, preferably maleic or fumaric acid, at the same temperature. The amidation reaction will proceed at lower temperatures, such as above about 160° C., but larger reaction times are necessary to insure complete reaction.

Weighting Agent

Any of the weight materials presently used in drilling fluids can be used in the oil-muds of this invention. This includes barite, galena, ilmenite, iron oxides (specular or micaeous hematite, magnetite, calcined iron ores, etc.), siderite, calcite, and the like.

Suspending Agent

Any of the known suspending agents for oil-muds may be used in the oil-muds of this invention. The preferred suspending agent is an organophilic clay (organoclay).

It is well known that organic compounds which contain a cation will react with clays which have an anionic surface and exchangeable cations to form organoclays. Depending on the structure and quantity of the organic cation and the characteristics of the clay, the resulting organoclay may be organophilic and hence have the property of swelling and dispersing or gelling in certain organic liquids depending on the concentration of organoclay, the degree of shear applied, and the presence of a dispersant. See for example the following U.S. Pat. Nos., all incorporated herein by reference for all purposes: 2,531,427 (Hauser); 2,966,506 (Jordan); 4,105,578 (Finlayson and Jordan); 4,208,218 (Finlayson); and the book "Clay Mineralogy", 2nd Edition, 1968 by Ralph E. Grim, McGraw-Hill Book Co., Inc., particularly Chapter 10—Clay Mineral-Organic Reactions, pp. 356–368—Ionic Reactions, Smectite, and pp. 392–40-1—Organophilic Clay-Mineral Complexes.

The preferred clays used for the preparation of the organophilic clays of this invention are attapulgite, bentonite, hectorite, saponite, and sepiolite. The organophilic clays based on attapulgite and sepiolite generally allow suspension of the weight material without drastically increasing the viscosity of the oil-mud, whereas the organophilic clays based on bentonite, hectorite, and saponite are gellants and appreciably increase the viscosity of the oil-mud.

The organophilic clays based on attapulgite or sepiolite should have a ME ratio from about 30 to about 50. The ME ratio (milliequivalent ratio) is defined as the number of milliequivalents of the cationic compound in the organoclay, per 100 grams of clay, 100% active clay bisis. Organophilic clays based on bentonite, hectorite, or saponite should have a ME ratio from about 75 to about 120. The optimum ME ratio will depend on the particular clay and cationic compound used to prepare the organoclay. In general it has been found that the gelling efficiency of organophilic clays in non-polar oleaginous liquids increases as the ME ratio increases. The most preferred organophilic clays, based on bentonite, hectorite, or saponite, will have an ME ratio in the range from 85 to about 110.

The organic quaternary compounds useful in the practice of this invention are selected from the group consisting of quaternary ammonium salts, quaternary phosphonium salts, and mixtures thereof. Representative quaternary phosphonium salts are disclosed in the following U.S. Pat. Nos., all incorporated herein by reference: 3,929,849 (Oswald) and 4,053,493 (Oswald). Representative quaternary ammonium salts are disclosed in U.S. Pat. No. 4,081,496 (Finlayson), incorporated herein by reference, in addition to the patents previously cited herein.

The preferred quaternary compounds comprise a quaternary ammonium salt having the structural formula

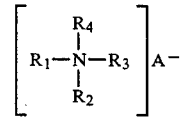

wherein $R_1$, $R_2$, $R_3$, and $R_4$ are independently selected from the group consisting of $C_aH_{2a\ 1-x}B_x$, $C_bH_{2b-1-x}B_x$, $C_6H_{5-x}B_xCH_2$, and mixtures thereof, $1 \leq a \leq 30$, $3 \leq b \leq 30$, $0 \leq x \leq 2$, B is a radical selected from the group consisting of OH, Cl, Br, $C_6H_5$, and mixtures thereof, and A is a charge balancing anion, provided that at least one R contains at least 12 carbon atoms, and $R_1$, $R_2$, $R_3$, and $R_4$ collectively contain at least 20 carbon atoms. Most preferably $x = 0$, and B is OH when x>0. A is preferably selected from the group consisting of Cl, Br, I, NO$_2$, OH, CH$_3$SO$_4$, and mixtures thereof, most preferably Cl.

Exemplary preferred quaternary ammonium cations are selected from the group consisting of trimethyl octadecyl ammonium, trimethyl hydrogenated tallow ammonium, trimethyl ricinoleyl ammonium, dimethyl didodecyl ammonium, dimethyl diotadecyl ammonium, dimethyl dicoco ammonium, dimethyl dihydrogenated tallow ammonium, dimethyl diricinoleyl ammonium, dimethyl benzyl octadecyl ammonium, dimethyl benzyl hydrogenated tallow ammonium, dimethyl benzyl ricinoleyl ammonium, methyl benzyl dioctadecyl ammonium, methyl benzyl dihydrogenated tallow ammonium, methyl benzyl diricinoleyl ammonium, methyl benzyl dicoco ammonium, methyl dibenzyl octadecyl ammonium, methyl dibenzyl hydrogenated tallow ammonium, methyl dibenzyl ricinoleyl ammonium, methyl dibenzyl coco ammonium, methyl trioctadecyl ammonium, methyl trihydrogenated tallow ammonium, methyl triricinoleyl ammonium, methyl tricoco ammonium, dibenzyl dicoco ammonium, dibenzyl dihydrogenated tallow ammonium, dibenzyl dioctadecyl ammonium, dibenzyl diricinoleyl ammonium, tribenzyl hydrogenated tallow ammonium, tribenzyl dioctadecyl ammonium, tribenzyl coco ammonium, tribenzyl ricinoleyl ammonium, and mixtures thereof.

Stabilizing Agent

Any of the known stabilizing agents (oil wetting agents) may be used in the oil-muds of this invention. Representative stabilizing agents are lecithin and various surfactants. See for example the following U.S. Pat. Nos., incorporated herein by reference: 2,612,471; 2,661,334; 2,943,051.

Temperature Stabilizing Additive

The temperature stabilizing additives of this invention contain from 2 to 6 carbon atoms and from 2 to 4 polar groups selected from the group consisting of hydroxyl (OH), primary amino (NH$_2$), and mixtures thereof, per molecule. Representative temperature stabilizing additives are ethylene glycol, propylene glycol, butylene glycol, hexylene glycol, glycerin, hexylene triol, ethanolamine, diethanolamine, triethanolamine, aminoethylethanol-amine, 2,3-diamino-1-propanol, 1,3-diamine-2-propanol, 3-amino-1,2-propanediol, 2-amino-1,3-propanediol, and the like. The preferred temperature stabilizing additives are selected from the groups consisting of ethylene glycol, propylene glycol, glycerin, and amino compounds having the structural formula:

$$H_yN[CH_2CH_2A]_z$$

where $0 \leq y \leq 2$, $1 \leq z \leq 3$, $y+z=3$, and A is a polar group selected from the group consisting of NH$_2$, OH, and mixtures thereof.

Fluid Loss Control Agent

Any of the known fluid loss control agents may be used in the oil-muds of this invention. This includes the various asphaltic materials and the organophilic humates. See for example the following U.S. Pat. Nos., incorporated herein by reference: 3,168,475; 3,281,458; 3,379,650; 3,494,865; 3,671,427; 3,775,447; 3,232,870; and 3,425,953. It is preferred to utilize the high temperature stable-organophilic humates disclosed in U.S. Pat. Nos. 3,494,865; 3,671,427; and 3,775,447. A commercially available material is DURATONE HT from NL Baroid Division, NL Industries Inc.

The oil-muds of our invention will generally contain the following amounts of materials:

|  | Useful Range | Preferred Range |
|---|---|---|
| Oil/Water ratio | 95/5–65/35 | 92/8–75/25 |
| Emulsifier | 3–20 ppb. | 5–15 ppb. |
| Suspending Agent | 2–15 ppb. | 3–10 ppb. |
| Stabilizing Agent | 0–10 ppb. | 0–5 ppb. |
| Temperature Stabilizing Additive | 0–10 ppb. | 2–8 ppb. |
| Fluid Loss Control Agent | 0–20 ppb. | 0–15 ppb. |
| NaCl or CaCl$_2$ | 0-S.A.P. (1) | (2) |
| Weighting Agent | (3) | (3) |

(1) S.A.P. = Saturated Aqueous Phase
(2) 20%–35% by weight of the aqueous phase
(3) Sufficient to give the desired density The oil-muds are prepared using standard oil-mud manufacturing procedures. Preferably the oil, suspending agent, and temperature stabilizing additive are first mixed together, optionally with the water or a portion thereof, before adding the emulsifier.

Our invention will be more clearly understood by reference to the following example. All data were obtained utilizing API Standard Procedure RP 13B. The viscosities were obtained using a Fann Model 35 viscometer. The viscosity data were used to calculate the rheological characteristics of the oil-muds by both the Bingham plastic model (as in API Standard Procedure RP 13B) and the Casson model (see "New Rheological Model Offers Field Alternative", R. V. Lauzon and K. I. G. Reid, Oil and Gas Journal, May 21, 1979, pp. 51–57). The Casson Model is more accurate in predicting the viscosity of a liquid at both very high and very low shear rates when measuring the viscosity only at intermediate shear rates. It is only necessary to measure the viscosity at 600 and 100 rpm with a variable speed rheometer. Square roots of the viscosities are then taken. These formulae are then used to calculate: the degree of shear thinning of the oil-mud, C; the viscosity at infinite shear rate, which can be used as an approximation of the bit viscosity, N$\infty$; and the low shear rate viscosity, which can be used to indicate the cuttings carrying capacity of the oil-mud, N$_1$. The following equations are used:

$$C = [N_{100}^{\frac{1}{2}} - N_{600}^{\frac{1}{2}}]16.89$$

$$N\infty = [1.69 N_{600}^{\frac{1}{2}} - 0.69 N_{100}^{\frac{1}{2}}]2$$

$$N_1 = [N\infty^{\frac{1}{2}} + C]^2$$

The following abbreviations may be used: ml.=milliliters; g.=grams; ppg.=pounds per gallon; ppb.=pounds per 42 gallon barrel of drilling fluid; cp.=centipoises; rpm=revolutions per minute; lb.=pounds; sq. ft.=square feet; sec.=seconds; min.=minutes.

EXAMPLE 1

An eighteen pound per gallon invert oil emulsion drilling fluid was prepared containing: 182 ml. of a refined petroleum oil containing primarily straight chain paraffinic hydrocarbons and 0.8% by volume of aromatic hydrocarbons having a viscosity of 1.26 cp. at 25° C., a flash point of 69° C., and an aniline point of 82° C.; 18.5 ml. water; 2.4 g. ethylene glycol temperature stability additive; 4 g. GELTONE II organophilic bentonite clay; 10 g. EZ MUL NT emulsifier; 7.8 g. calcium chloride; 2.0 gm. lime; 6 g DURATONE HT modified lignite fluid loss control agent; and 620 g. barite weighting agent. The water, ethylene glycol, and GELTONE II were mixed with the oil in order to maximize the dispersion/gelation of the organophilic clay before the remaining materials were added.

This mud was evaluated for rheology and emulsion stability initially, after rolling 4 hours at 150° F., and after static aging for 16 hours at 400° F. The data obtained are given in Table 1.

COMPARATIVE EXAMPLE A

An 18 ppg. invert oil emulsion drilling fluid was prepared as in Example 1 except that commonly used No. 2 diesel oil was used in place of the refined petroleum oil of this invention. To correct for the higher specific gravity of the diesel oil, the following changes were made in the amounts of materials used: 192 ml. diesel oil; 19.5 ml. water; 8.2 g. calcium chloride; and 575 g. barite.

This mud was evaluated as in Example 1. The data obtained are given in Table 2.

COMPARATIVE EXAMPLE B

An 18 ppg. invert oil emulsion drilling fluid was prepared as in Example 1 except that MENTOR 28, a high viscosity refined petroleum oil having a viscosity of 4.83 cp. at 25° C. and a flash point of 127° C. was used in place of the refined petroleum oil of this invention. The amounts of materials used in this oil-mud were the same as those used in Comparative Example A since the specific gravity of the two oils is the same.

This mud was evaluated as in Example 1. The data obtained are given in Table 3.

Comparison of the data in Tables 1-3 indicate that the invert oil emulsion drilling fluids of this invention are more thermally stable and have a much lower high shear viscosity. Thus it would be expected that the drilling fluids of this invention would significantly increase the rate of penetration during drilling and would require much fewer chemical additions to maintain the desired mud properties when drilling at elevated temperatures.

TABLE 1

|  | Example 1 | | |
| --- | --- | --- | --- |
|  | Initial | 14 Hours @ 150° F. | 16 Hours @ 400° F. |
| Fann Data |  |  |  |
| 600 rpm | 66 | 66 | 55 |
| 300 rpm | 38 | 37 | 28 |
| 200 rpm | 27 | 27 | 20 |
| 100 rpm | 17 | 17 | 13 |
| 6 | 6 | 6 | 4 |
| 3 rpm | 5 | 5 | 3 |
| API (Bingham Plastic) Rheology |  |  |  |
| Apparent Viscosity, cp. | 33 | 33 | 27.5 |
| Plastic Viscosity, cp. | 28 | 29 | 27 |
| Yield Point, lb./100 sq. ft. | 10 | 8 | 1 |
| 10-Sec. Gel Strength, lb./100 sq. ft. | 7 | 6 | 5 |
| 10-Min. Gel Strength, lb./100 sq. ft. | 8 | 8 | 6 |
| Casson Rheology |  |  |  |
| $N\infty$, cp. | 22.9 | 22.9 | 20.7 |
| $N_1$, cp. | 805 | 805 | 460 |
| C | 23.6 | 23.6 | 16.9 |
| Emulsion Stability | 2000 | 2000 | 2000 |

TABLE 1-continued

|  | Example 1 | | |
| --- | --- | --- | --- |
|  | Initial | 14 Hours @ 150° F. | 16 Hours @ 400° F. |
| Voltage Breakdown, volts |  |  |  |

TABLE 2

|  | Comparative Example A | | |
| --- | --- | --- | --- |
|  | Initial | 4 Hours @ 150° F. | 16 Hours @ 400° F. |
| Fann Data |  |  |  |
| 600 rpm | 151 | 124 | 85 |
| 300 rpm | 102 | 82 | 46 |
| 200 rpm | 83 | 67 | 33 |
| 100 rpm | 63 | 50 | 19 |
| 6 rpm | 33 | 25 | 5 |
| 3 rpm | 30 | 23 | 4 |
| API (Bingham: Plastic) Rheology |  |  |  |
| Apparent Viscosity, cp. | 75.5 | 62 | 42.5 |
| Plastic Viscosity, cp. | 49 | 42 | 39 |
| Yield Point, lb./100 sq. ft. | 53 | 40 | 7 |
| 10-Sec. Gel Strength, lb./100 sq. ft. | 29 | 23 | 7 |
| 10-Min. Gel Strength, lb./100 sq. ft. | 35 | 27 | 9 |
| Casson Rheology |  |  |  |
| $N\infty$, cp. | 27.0 | 23.6 | 33.7 |
| $N_1$, cp. | 8215 | 6197 | 539 |
| C | 85.4 | 73.9 | 17.4 |
| Emulsion Stability Voltage Breakdown, volts | 2000 | 2000 | 2000 |

TABLE 3

|  | Comparative Example B | | |
| --- | --- | --- | --- |
|  | Initial | 4 Hours @ 150° F. | 16 Hours @ 400° F. |
| Fann Data |  |  |  |
| 600 rpm | 168 | 143 | 114 |
| 300 rpm | 94 | 85 | 60 |
| 200 rpm | 70 | 65 | 42 |
| 100 rpm | 45 | 42 | 25 |
| 6 rpm | 14 | 14 | 6 |
| 3 rpm | 13 | 13 | 5 |
| API (Bingham Plastic) Rheology |  |  |  |
| Apparent Viscosity, cp. | 84 | 71.5 | 57 |
| Plastic Viscosity, cp. | 54 | 58 | 54 |
| Yield Point, lb./100 sq. ft. | 40 | 27 | 6 |
| 10-Sec. Gel Strength, lb./100 sq. ft. | 14 | 14 | 7 |
| 10-Min. Gel Strength, lb./100 sq. ft. | 18 | 16 | 9 |
| Casson Rheology |  |  |  |
| $N\infty$, cp. | 55.8 | 42.8 | 46.0 |
| $N_1$, cp. | 2393 | 2843 | 652 |
| C | 41.4 | 46.7 | 18.8 |
| Emulsion Stability Voltage Breakdown, volts | 2000 | 2000 | 2000 |

The drilling fluids of this invention are advantageous in the drilling of oil or gas wells which utilize a rotary drilling process. Thus the drilling fluid is circulated throughout a borehole while similtaneously or periodically rotating a string of pipe containing a rotary drilling bit on its lower end in contact with the bottom of the borehole. Normally this is accomplished by flowing the drilling fluid through the pipe string and the bit, and thereafter up the annulus to the surface, all as is well known in the drilling industry.

We claim:

1. A fast drilling invert oil emulsion drilling fluid having enhanced stability at elevated temperatures which comprises oil, water, a water-in-oil emulsifier, a weighting agent, a suspending agent, and a temperature stabilizing additive, wherein said oil is a refined petroleum oil fraction containing primarily straight chain paraffinic hydrocarbons and less than 1% by volume of aromatic hydrocarbons, having a viscosity less than 1.5 centipoises at 25° C., a flash point of at least 60° C., and an aniline point of at least 80° C.; wherein said water contains up to a saturation amount of NaCl or $CaCl_2$; wherein said suspending agent is an organophilic clay which comprises the reaction product of a clay selected from the group consisting of attapulgite, bentonite, hectorite, saponite, and sepiolite, and a quaternary ammonium salt having the structural formula:

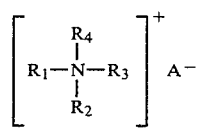

wherein $R_1$, $R_2$, $R_3$, and $R_4$ are independently selected from the group consisting of $C_aH_{2a+1-x}B_x$, $C_bH_{2b-1-x}B_x$, $C_6H_{5-x}B_xCH_2$, and mixtures thereof, $1 \leq a \leq 30$, $3 \leq b \leq 30$, $0 \leq x \leq 2$, B is a radical selected from the group consisting of OH, Cl, Br, $C_6H_5$, and mixtures thereof, and A is a charge balancing anion, provided that at least one R contains at least 12 carbon atoms, and $R_1$, $R_2$, $R_3$, and $R_4$ collectively contain at least 20 carbon atoms; and wherein said temperature stabilizing additive contains from 2 to 6 carbon atoms and from 2 to 4 polar groups selected from the group consisting of OH, $NH_2$, and mixtures thereof, per molecule.

2. The drilling fluid of claim 1 wherein said emulsifier is a polyamide obtained by reacting a monocarboxylic fatty acid, at least 50% by weight of which contains 18 carbon atoms, and a dicarboxylic acid containing from 4 to 8 carbon atoms with a polyethylene polyamine containing from 3 to 7 nitrogen atoms in a molar ratio of said monocarboxylic acid: dicarboxylic acid: polyethylene polyamine from about 0.4 n–0.7 n:0.3 n–0.15 n: 1 where n is the number of nitrogen atoms in each molecule of said polyethylene polyamine.

3. The drilling fluid of claim 2 wherein said monocarboxylic acid contains from 16 to 18 carbon atoms and said dicarboxylic acid contains 4 carbon atoms.

4. The drilling fluid of claim 3 wherein said dicarboxylic acid is selected from the group consisting of maleic acid, fumaric acid, and mixtures thereof.

5. The drilling fluid of claim 1 wherein said temperature stabilizing additive is selected from the group consisting of ethylene glycol, propylene glycol, glycerin, and amino compounds having the structural formula

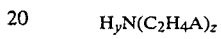

where $0 \leq y \leq 2$, $1 \leq z \leq 3$, $y+z=3$, and A is a polar group selected from the group consisting of $NH_2$, OH, and mixtures thereof.

6. The drilling fluid of claim 1 which contains a stabilizing agent to promote the oil wetting of any solids which enter said drilling fluid.

7. The drilling fluid of claim 1 which contains an additive to reduce the fluid loss of said drilling fluid.

8. A method of enhancing the rate of penetration while drilling a well which comprises circulating the invert oil emulsion drilling fluid of claim 1 throughout a borehole while simultaneously rotating a string of drill pipe containing a rotary drill bit on its lower end in contact with the bottom of the borehole, thereby removing the drill cuttings formed by said drill bit from said borehole.

* * * * *